(12) United States Patent
Lenzen et al.

(10) Patent No.: US 7,114,359 B2
(45) Date of Patent: Oct. 3, 2006

(54) METHOD FOR PRODUCING BENT SPRING RAILS FROM AN ENDLESS SPRING BAND

(75) Inventors: Oliver Lenzen, Sachsenheim (DE); Gerald Pachur, Hessigheim (DE); Oliver Blumenstock, Abstatt-Happenbach (DE)

(73) Assignee: Valeo Systemes d'Essuyage, (FR)

( * ) Notice: Subject to any disclaimer, the term of this patent is extended or adjusted under 35 U.S.C. 154(b) by 251 days.

(21) Appl. No.: 10/415,926

(22) PCT Filed: Nov. 6, 2001

(86) PCT No.: PCT/EP01/12838

§ 371 (c)(1),
(2), (4) Date: May 5, 2003

(87) PCT Pub. No.: WO02/38299

PCT Pub. Date: May 16, 2002

(65) Prior Publication Data

US 2004/0250598 A1 Dec. 16, 2004

(30) Foreign Application Priority Data

Nov. 11, 2000 (DE) ............... 100 56 054
Nov. 11, 2000 (DE) ............... 100 56 055

(51) Int. Cl.
*B21D 11/10* (2006.01)
*B60S 1/38* (2006.01)

(52) U.S. Cl. ............ 72/203; 72/324; 72/342.5; 72/380; 72/335; 72/130; 72/129; 72/132; 72/702; 29/33 S; 29/417; 29/896.9

(58) Field of Classification Search ........... 72/342.1, 72/379.2, 166, 379.9, 169, 364, 131, 129, 72/171, 172, 342.5, 702, 132; 29/896.9, 29/896.91, 33 S, 417; 266/116; 267/229; 148/580

See application file for complete search history.

(56) References Cited

U.S. PATENT DOCUMENTS 1,489,894 A * 4/1924 Monteith et al. ............. 72/171

(Continued)

FOREIGN PATENT DOCUMENTS

DE 198 16 609 10/1999

(Continued)

*Primary Examiner*—Dmitry Suhol
(74) *Attorney, Agent, or Firm*—Young & Basile, P.C.

(57) ABSTRACT

The invention relates to a method for producing bent spring rails from an endless spring band. The method is characterized by the following steps: continuous bending of a section of spring band; cutting the bent section of spring band into a spring rail; discontinuous reverse bending to reduce the internal stresses of the bent, cut-to-length spring rail by subjecting the spring rail to at least one reverse bending force and/or heat-treating the cut-to-length spring rails, the heat treatment being a low-temperature treatment in this case, preferably at a temperature of less than 200 *C.

26 Claims, 3 Drawing Sheets

U.S. PATENT DOCUMENTS

| | | | |
|---|---|---|---|
| 2,503,597 A * | 4/1950 | Rodder | 72/164 |
| 3,192,551 A | 7/1965 | Appel | |
| 3,339,908 A * | 9/1967 | Komarnitsky | 267/47 |
| 3,908,431 A * | 9/1975 | Jones et al. | 72/364 |
| 4,549,422 A * | 10/1985 | Harrow | 72/131 |
| 4,912,957 A * | 4/1990 | Petersen et al. | 72/389.6 |
| 5,875,672 A * | 3/1999 | Fourie et al. | 72/240 |
| 6,063,216 A | 5/2000 | Damm et al. | |
| 6,253,411 B1 * | 7/2001 | Aichele et al. | 15/250.43 |
| 6,532,638 B1 * | 3/2003 | Wilhelm et al. | 29/407.04 |
| 6,755,066 B1 * | 6/2004 | Lenzen | 72/175 |
| 2002/0043092 A1 * | 4/2002 | Jones et al. | 72/342.1 |
| 2003/0000607 A1 * | 1/2003 | Jenner | 148/652 |

FOREIGN PATENT DOCUMENTS

| | | | |
|---|---|---|---|
| JP | 01087014 A * | 3/1989 | |
| WO | WO 9417932 A1 * | 8/1994 | |

* cited by examiner

METHOD FOR PRODUCING BENT SPRING RAILS FROM AN ENDLESS SPRING BAND

BACKGROUND

The invention relates to a method for producing bent spring rails from an endless, or continuous, spring band or strip. The invention further relates to a bending apparatus to perform this procedure.

Spring rails of this type form the support for flat-bar windshield wipers specifically for motor vehicles. In the case of these flat-bar windshield wipers, the support, in the form of one or even more, specifically two, strip-like, elongate spring rails, ensures optimal distribution of the pressure exerted by a wiper arm on the wiper blade against a windshield glass to be wiped. To achieve this, the support is bent accordingly in its unloaded state when the wiper blade is not resting against the windshield glass with a specified curvature. The section of the spring rail, or the spring rail, can have a constant cross-section or one which varies in the longitudinal direction. The support for a flat wiper blade of this type replaces the complex yoke construction such as is known from DE 15 05 397 A1, with two spring rails located at the wiper rubber and not pre-curved in the unloaded state.

SUMMARY

The production of specifically pre-curved spring rails has proved to be problematic. Particularly when unrolling the continuous spring steel strip from a roll as well as during the bending process as such and during the preceding process steps, internal stresses are created in the spring rail material which can negatively affect the properties of the spring rail section in its bent state or of the spring rail when it is subsequently placed in operation. When load and operating stresses are superimposed on these internal stresses when the wiper blade is in use, the range of plastic deformation is quickly reached. The result is a permanent change in component geometry caused by its taking a set which can lead to partial or even complete loss of component function.

From DE 198 16 609 a method is known for producing curved spring rails from a continuous spring strip, in which a continuous spring strip is initially bent over several support points and is then bent back at a subsequent support point by a lesser degree of bend in the opposite direction to the first bend. The spring rail section treated in this way is subsequently cut from the continuous strip to obtain the spring rail proper. As a result of the continuous bending and reverse bending of the continuous spring strip, internal stresses in the curved spring rail material are reduced, whereby permanent changes in the spring rail from taking a set or from load and operating stresses do not occur, or occur to a reduced degree, and permanent functional reliability of the spring rail is ensured.

The known method does, however, have the disadvantage that the optimal adjustment of the process parameters, specifically the adjustment of the support points in the form of rollers, and particularly the adjustment of the reverse bending rollers, is extremely involved. If only one bending roller is adjusted, an adjustment must be made to the reverse bending roller, which depends on the first adjustment to obtain a desired reverse bend in the spring strip section in a continuous bending process.

SUMMARY

The object of the present invention is, therefore, to prepare a method for producing bent spring rails from a continuous spring strip which mitigates the aforementioned disadvantages of the prior art and which can be implemented simply.

This object is attained with a method for producing bent spring rails from an endless spring strip which is characterized by the following procedural steps:

continuous bending of a spring strip section, cutting the bent spring strip section to length to make a spring rail, discontinuous reverse bending of the spring rails to reduce internal stresses in the bent and cut-to-length spring rail by subjecting the spring rail to at least one reverse bending force, and/or heat treatment of the cut-to-length spring rails, where the heat treatment is a low-temperature treatment and preferably takes place at a temperature below 200° C.

In contrast to the prior art which integrates the reverse bending process into the overall operating function of a bending machine and consequently directly links the bending and reverse bending process for the continuous spring strip, under the invention there is functional and spatial separation of the bending and reverse bending process. Cutting the appropriately pre-bent spring strip to length takes place after the spring strip section comes from the continuous spring strip, with the result that reverse bending of the spring rail can take place discontinuously in an additional independent step, that is to say, independently of the bending process for the continuous spring strip. It is a particular advantage of the invention that from the perspective of process technology the bending process taking place continuously and the reverse bending process taking place discontinuously can be optimized separately and thus independently of each other and without reacting one on the other. With respect to the process, control modules which are easy to manage, independent and simple to maintain, such as software, profiled discs or cam discs, can be employed. Since it is not necessary to have a direct correlation of cycles to the bending process, the process can be employed very flexibly. Enormous cost benefits result in volume production from such a simply designed system.

The process in accordance with the invention is characterized by extremely high flexibility. Reverse bending can either be carried out manually by means of a simple device or by means of a device operating mechanically, pneumatically or hydraulically.

In the event that the process in accordance with the invention provides for low-temperature heat treatment after cutting the bent spring strip section to length for a spring rail, preferably at a temperature below 200° C., the material, or the spring rails, are statically age hardened. This permits stabilization of the displacement structure through diffusion of carbon atoms, where edge dislocations are effectively anchored and no further plastic deformation can take place until increased yield stress has been achieved. The working principle of low-temperature heat treatment lies accordingly not in the reduction of internal stress through the influence of temperature, as happens, for example, with low-stress annealing at a temperature of about 580° C.–650° C. The advantage of low-temperature treatment is its cost and energy efficiency, particularly in comparison with low-stress annealing, because the temperatures are below 200° C. In addition, with low-temperature treatment possible deterioration of strength properties need not be taken into consideration.

The temperature-shielded stabilization of the spring rails is advantageously decoupled from the bending process, so that reaction-free optimization of the low-temperature heat treatment is possible.

In the event that the method according to the invention provides for discontinuous reverse bending of the spring rails and low-temperature heat treatment, preferably at a temperature below 200° C., high-quality stabilization of the spring rails can be achieved, with the added benefits of the advantages already described.

In a particularly advantageous aspect of the invention, the spring rail is forced against a pressure surface using pressure before it is subjected to the reverse bending force.

It is particularly advantageous if the pressure is applied at the point of greatest curvature in the spring rail. The advantage is that the highest bending moment is achieved at the point of greatest curvature, whereby high internal stresses present are reduced.

It has been shown that the internal stress of spring rails that have been cut to length and bent are advantageously reduced if the pressure is applied in the middle.

Depending on how the spring rail is used subsequently, it can be advantageous if the pressure surface is configured flat or curved.

Instead of, or in addition to forcing the spring rail against a pressure surface, it is conceivable under the invention that the spring rail is clamped held in a fixture before being subjected to the reverse bending force. Clamping precludes any possibility on the part of the spring rail to escape in undesirable directions when force is applied, thereby preventing the creation of additional, undesirable internal stresses.

In particularly advantageous aspects of the invention, the clamping of the spring rail takes place at the point of the greatest curvature and or in the center of the spring rail.

A characteristic of an aspect of the method under the invention, which is particularly preferred in practice, is that through the reverse bending force a largely linear reverse bending moment results from the contact point of the reverse bending force to the contact point of the pressure, or to the clamping location. The effect of such a reverse bending moment is that the strongest reverse bending is accomplished in the area of the greatest deformation, reducing the high internal stresses in the area of the greatest deformation.

In a further advantageous aspect of the invention, the spring rails are subjected to several, preferably two, reverse bending forces applied at different points, where the reverse bending forces are preferably applied in the areas of the two free ends of the spring rails. The advantageous effect of this is to introduce a largely linear, beneficial bending moment into the spring rails. Particularly if several reverse bending forces are introduced symmetrically, the result is a symmetrical and thus advantageous reverse bending of the spring rails.

In a further advantageous aspect of the invention, the spring rail is subjected to several reverse bending force synchronously or in succession.

Under the invention it is conceivable that the spring rail is subjected to at least the one reverse bending force at least once, preferably two to five times in succession. In so doing, specific consideration can be given to the reduction of stress which can be expected with the repeated application and removal of load, which indicates the onset of a permanent plastic deformation (Bauschinger effect).

The at least one reverse bending force can be advantageously load or displacement controlled. With load-controlled force, reverse bending force is applied to the spring rail until the force reaches a particular level. With displacement-controlled force, the reverse bending process is stopped after a pre-determined bending path has been covered.

In a further advantageous aspect of the invention, several spring rails, arranged parallel to each other, bent and cut to length, undergo reverse bending synchronously. A plurality of spring rails can advantageously be reverse bent only using one machine version. This substantially reduces the total number of reverse bending processes which would otherwise have to be performed sequentially.

In accordance with the invention, the values for the reverse bending, and specifically the reverse bending force and/or the reverse bending displacement, can be determined empirically. These values are basically dependent on the moment of inertia, the cross-sectional area, the height x of the bend prior to reverse bending and the desired height y of the bend following reverse bending. In addition to empirically determining the suitable values, the quality of the reverse bending can also be determined from material-specific and geometry-specific maps.

With respect to heat treatment, it has been shown that particularly positive and high-quality results are achieved at a temperature of preferably 140° C.

The length of the heat treatment should be less than one hour and preferably about 30 minutes. The length of the heat treatment was determined empirically, where particularly advantageous and high-quality spring rails resulted at the values given.

In a further development of the method, the spring rails are not negatively affected in their temperature-dependent change in geometry during the heat treatment. Care must be taken to ensure that the individual spring rails do not touch each other and are not hampered in their temperature-dependent change in geometry by elements of the feeder or magazining system, in order to prevent the creation of additional load stresses. This ensures that the static age hardening of the material can proceed undisturbed and without negative outside influences.

Under the invention it is also conceivable that the heat treatment takes place continuously or discontinuously. With continuous heat treatment, the spring rails are taken on a conveyor belt, for example, through a heating station. With discontinuous heat treatment, the spring rails are placed in a heating station, for example, and removed from it at the conclusion of the treatment.

Furthermore it is conceivable under the invention that the spring rails are coated and specifically have a paint and/or plastic coating. The temperature of the heat treatment is then below a possibly existing re-crystallization temperature for the plastic coating or below a temperature which could result in an undesirable change in the paint coat on the spring rails.

The temperature and the duration of the treatment must be determined empirically, dependent specifically on the material, the surface coating and spring rail geometry and/or read from already established maps.

Following a low-temperature heat treatment, the spring rails can be taken to a magazine.

The object stated at the beginning is achieved by a bending device to carry out the process described in the preceding description

BRIEF DESCRIPTION OF THE DRAWING

Additional advantageous aspects and details of the invention can be derived from the description that follows, in which the invention is described in greater details and explained from the aspects shown in the drawing.

DETAILED DESCRIPTION

Figure 1:
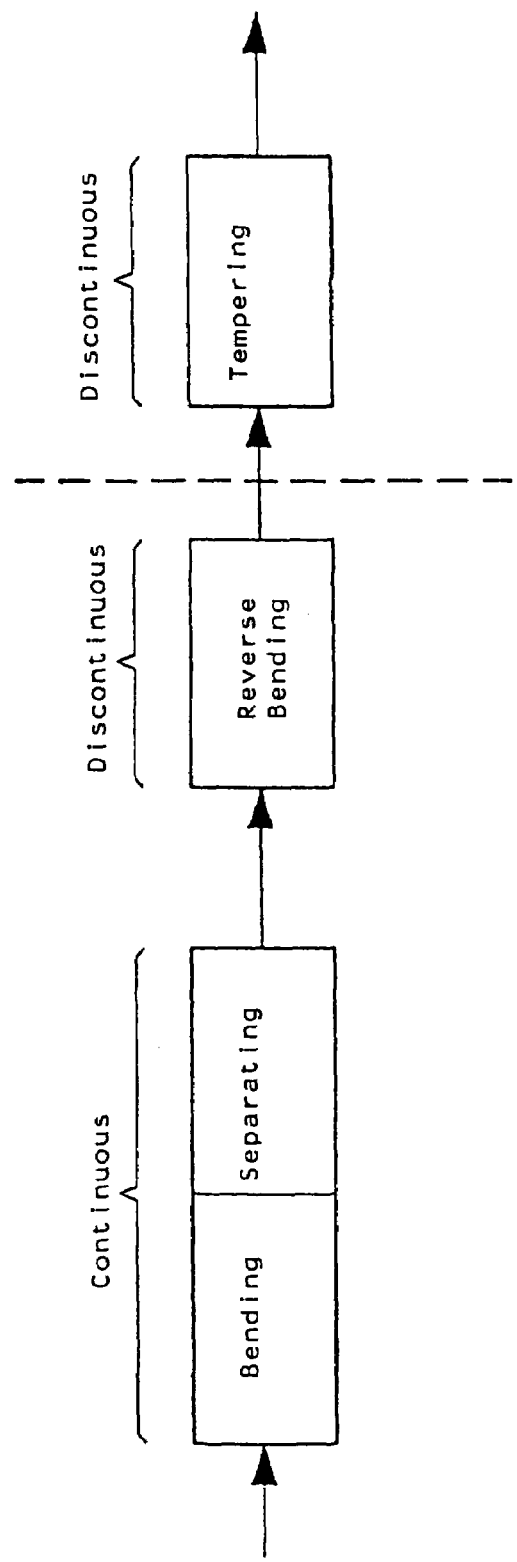
FIG. 1 shows a flow chart of a method in accordance with the invention.

From the flow chart in accordance with FIG. 1, it can be seen that the spring strip section from a continuous spring strip forming the spring rail is first bent and then separated. Bending and separation take place continuously. In a next, discontinuous step, the spring rail is reverse bent to reduce internal stresses in the bent and cut-to-length spring rails. Following this, provision can also be made in an additional, discontinuous step for the spring rails to be tempered and specifically subjected to low-temperature heat treatment. Either following the reverse bending or after the additional tempering, the spring rails can be transported to the assembly process (not shown) and assembled to a flat-bar wiper blade or suitable wiping device. Stabilization of the spring rail can also take place without the benefit of the discontinuous step of reverse bending solely by the discontinuous step of tempering in a low-temperature heat treatment.

FIGS. 2 to 5 illustrate the step of reverse bending shown in FIG. 1.

Figure 2:
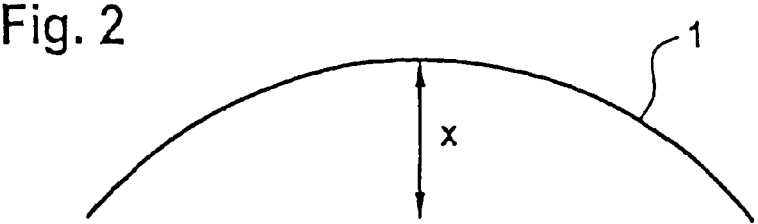
FIGS. 2 to 5 show individual procedural steps of the reverse bending process of a first aspect of the invention.

FIG. 2 shows a side view of the cut-to-length and bent spring strip section formed into a spring rail 1. After bending, the spring rail 1 exhibits a curvature to the horizontal having the height x.

Figure 3:
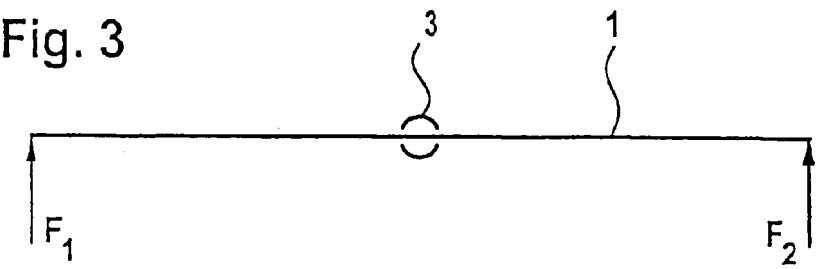
Figure 4:
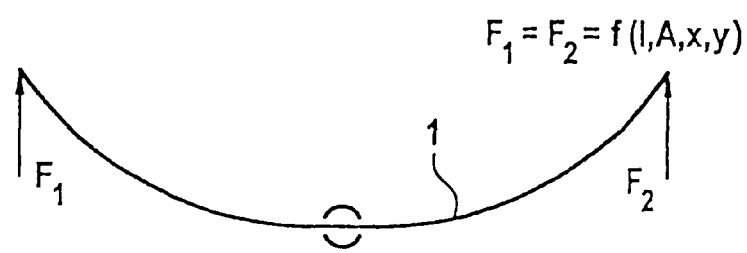

For reverse bending, the spring rail 1, as shown in FIG. 3, is clamped in the center by means of a fixture 3 and undergoes reverse bending with two reverse bending forces $F_1$ and $F_2$ which have the same magnitude, such that the spring rail 1 assumes a largely planar position. If the reverse bending forces $F_1$ and $F_2$ are increased, the planar position of the spring rail shown in FIG. 3 is converted into an overbent position shown in FIG. 4. The maximum reverse bending of the spring rail 1 is shown in FIG. 4. The values attained by the reverse bending forces $F_1$ and $F_2$ can be controlled either according to displacement or load. The absolute height of the reverse bending forces $F_1$ and $F_2$ is basically composed of a function of the moment of inertia, the cross-sectional area, the height of the bend x prior to reverse bending and the height of the bend y following reverse bending.

Figure 5:
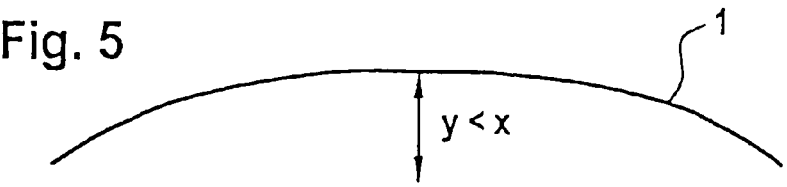

The reverse-bent spring rail is shown in its unloaded condition in FIG. 5. It can clearly be seen that the height y of the spring rail 1 following reverse bending is smaller than the height x of the bend in the spring rail 1 prior to reverse bending.

In FIGS. 6–9, in which a different reverse bending process is shown, the spring rail 1 is forced against a flat pressure surface 5. The pressure surface 5 is, as can be clearly seen from FIGS. 6–9, configured flat. However, it is also conceivable that a curved pressure surface can be used in place of a flat pressure surface.

Figure 6:
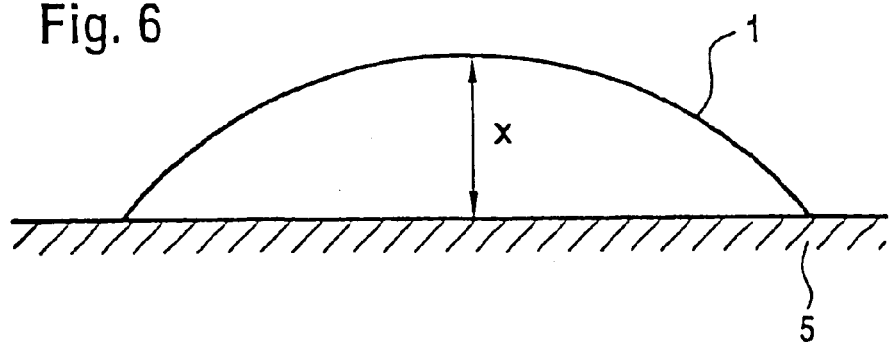
FIGS. 6 to 9 show individual steps of a further aspect of the invention for the reverse bending process.

In FIG. 6, the spring rail 1 is shown unloaded in accordance with FIG. 2 after the bending and cutting-to-length procedure with both its free ends resting on the pressure surface 5. The height of the bend of the spring rail 1 has the value x.

Figure 7:
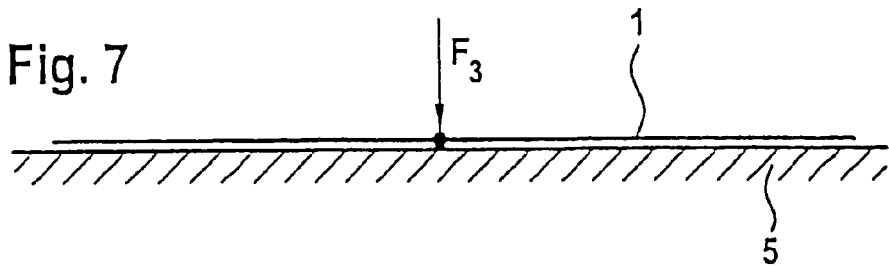

FIG. 7 shows the next procedural step, in which a force $F_3$ makes contact at the point of greatest curvature of the spring rail 1, or in the middle of the spring rail 1, and presses the spring rail 1 completely against the pressure surface 5.

Figure 8:
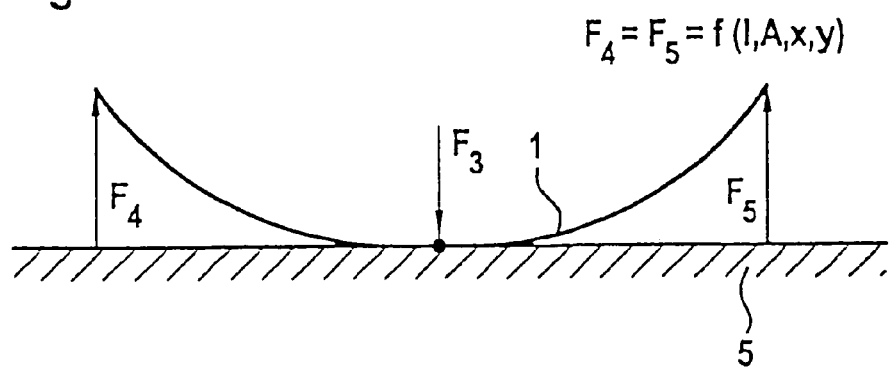

In a next step, which is shown in FIG. 8, the free ends of the spring rail 1, in accordance with FIG. 4, are subjected to reverse bending forces $F_4$ and $F_5$ which overbend the spring rail 1. The absolute height of the reverse bending forces $F_4$ and $F_5$, like the height of reverse bending forces $F_1$ and $F_2$, is dependent on the moment of inertia, the cross-sectional area, the height of the bend in spring rail 1 before bending and the height of the bend in spring rail 1 after reverse bending.

Figure 9:
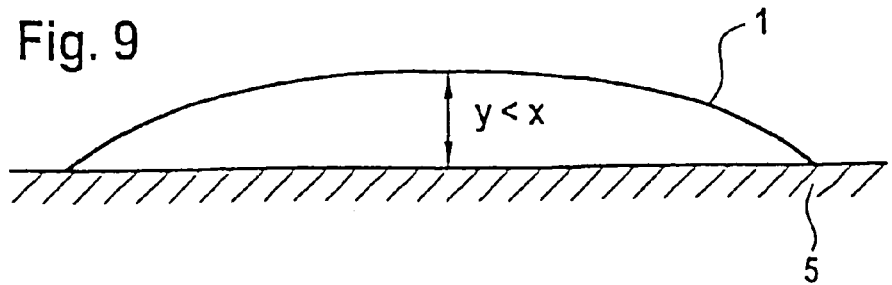

As can be seen from FIG. 9, the height y after reverse bending is less than the height x of the bend in the spring rail 1 before reverse bending.

Because the reverse bending forces $F_1$ and $F_2$, or $F_4$ and $F_5$ in the case of the two embodiments of the invention shown in the Figures, are applied at the free ends of the spring rail 1, the result is an advantageous linear bending moment from the contact points of the reverse bending forces to the point at which the spring rail is clamped or is forced against the pressure surface 5 under force $F_3$. The reverse bending process shown in FIGS. 2–5, or 6–9, should be repeated specifically two to five times to obtain high-quality spring rails which operate reliably on a permanent basis. Reverse bending of the individual ends of the spring rail 1 can be carried out synchronously or asynchronously.

All the features contained in the description, the claims which follow and the drawing can be fundamental to the invention both individually and in any combination.

What is claimed is:

1. A method for producing bent spring rails from a continuous spring strip, characterized by the steps of:
    continuous bending of a section of spring steel strip;
    cutting to length of the bent section of spring steel strip to form a spring rail; and
    after cutting, reverse bending of the spring rail to reduce internal stress in the bent and cut-to-length rail by subjecting the spring rail to at least one reverse bending force.

2. The method of claim 1, further comprising the step of:
    after the reverse bending, heat treating the spring rails by means of low-temperature heat treatment.

3. The method of claim 1 further comprising the step of forcing the spring rail against a pressure surface under a force before subjecting the spring rail to the at least one reverse bending force.

4. The method of claim 3 further comprising the step of applying the force at a point of greatest curvature of the spring rail.

5. The method of claim 3, further comprising the step of applying the force on the spring rail in the center of the spring rail.

6. The method of claim 3, wherein the pressure surface is configured as at least one of a planar surface and a curved surface.

7. The method of claim 1 further comprising the step of holding the spring rail in a clamp before the spring rail is subjected to reverse bending.

8. The method of claim 7 further comprising the step of clamping the spring rail at a point of greatest curvature.

9. The method of claim 7, further comprising the step of clamping the spring rail in a center of the spring rail.

10. The method of claim 1 wherein the at least one reverse bending force creates a substantially linear reverse bending moment from a contact point of the at least one reverse bending force to at least one of a contact point of a pressure force and a location of a clamp.

11. The method of claim 1, further comprising the step of subjecting the spring rail to a plurality of reverse bending moments contacting different points, where reverse bending forces make contact in areas of two free ends of the spring rail.

12. The method of claim 1 further comprising the step of subjecting the spring rail to a plurality reverse bending forces, wherein the plurality of reverse bending forces are applied in at least one of a simultaneous force application step and a successive force application step.

13. The method of claim 1 further comprising the step of subjecting the spring rail to the at least one reverse bending force a plurality of times in succession.

14. The method of claim 1, further comprising the step of using at least one of a force control and a displacement control when subjecting the spring rail to the at least one reverse bending force.

15. The method of claim 1, wherein a value for at least one of a reverse bending force and a reverse bending displacement is determined empirically.

16. The method of claim 1, wherein the spring rails are coated.

17. The method of claim 1, further comprising the step of heat treating the cut-to-length spring rail, wherein the heat treatment is low-temperature heat treatment and is performed at a temperature below 200° C.

18. The method of claim 17, wherein a plurality of spring rails disposed parallel to each other are reverse-bent simultaneously.

19. The method of claim 17, wherein the heat treatment preferably takes place at a temperature of approximately 140° C.

20. The method of claim 17 wherein a duration of the heat treatment is less than one hour.

21. The method of claim 17, wherein a duration of the heat treatment is determined empirically.

22. The method of claim 17, wherein the spring rails are not adversely affected in their temperature-related change of geometry during the heat treatment.

23. The method of claim 17, wherein the heat treatment takes place in at least one of a continuous heat treatment step and a discontinuous heat treatment step.

24. The method of claim 17, wherein the duration of the heat treatment is substantially 30 minutes.

25. The method of claim 1, wherein the spring rails are coated with at least one of a paint coating and a plastic coating.

26. A method for producing bent spring rails from a continuous spring strip, characterized by the steps of:
   continuous bending of a section of spring steel strip;
   cutting to length of the bent section of spring steel strip to form a spring rail; and
   after the cutting step, reverse bending of the spring rail to reduce internal stress in the bent and cut-to-length rail by subjecting the spring rail to at least one reverse bending force independent of the previous continuous bending step.

* * * * *